United States Patent [19]

Jean

[11] Patent Number: 4,682,771
[45] Date of Patent: Jul. 28, 1987

[54] MASSAGE-FUNCTIONAL PEDAL STRUCTURE

[76] Inventor: San B. Jean, 81-1, Hsin Hsing Rd., Toucheng Jenn, I-LAN Shiann, Taiwan

[21] Appl. No.: 777,452

[22] Filed: Sep. 18, 1985

[51] Int. Cl.$^4$ ............................................. A63B 21/00
[52] U.S. Cl. ..................................... 272/73; 128/25 B; 128/56
[58] Field of Search ............ 272/73; 128/25 R, 25 B, 128/51, 52, 54, 56, 63; 74/560, 594.4

[56] References Cited

U.S. PATENT DOCUMENTS

| | | | |
|---|---|---|---|
| 1,276,526 | 8/1918 | Hardy et al. | 128/52 |
| 1,387,687 | 8/1921 | Chaussinand | 128/51 |
| 4,150,667 | 4/1979 | Takeuchi | 272/73 |
| 4,523,580 | 6/1985 | Tureaud | 128/25 B |

Primary Examiner—Richard J. Apley
Assistant Examiner—S. R. Crow
Attorney, Agent, or Firm—Wenderoth, Lind & Ponack

[57] ABSTRACT

A pedal which massages a user's foot having a rotating shaft and a plurality of crank shafts in the pedal body, offset portions of the said crank shafts act as cams to move a plurality of elongated cylinders above and below a face board of the pedal. The user steps on the pedals and mutually engaging gears installed on the rotating shaft and the crank shafts drive the crank shafts which in turn moves a plurality of the elongated cylinders in up-and-down displacements so as to apply massaging impact actions to an operator's soles.

12 Claims, 9 Drawing Figures

MASSAGE-FUNCTIONAL PEDAL STRUCTURE

FIELD OF THE INVENTION

A pedal structure which may be mounted on an exercise treadmill or bicycle, having an inner part of the body of the pedal in a hollow design through which a crank shaft is movably connected to several elongated cylinders, the crank shaft being rotated by a rotating shaft whereby the crank shaft drives a plurality of the elongated cylinders with an up-and-down displacement above and below the upper end face of the pedal body to produce a massaging effect on a user's soles.

BACKGROUND OF THE INVENTION

The pedals of the conventional body building exercisers (such as the exercise treadmills) and the bicycles are mainly for the operator's feet to step on and use force against in order to drive the body building exercisers into motion and the bicycles into the expected actions. A rotating shaft connects the pedals to a crank arm of the body building bicycles, one end of the rotating shaft being fixedly joined to the crank arm, while the pedal is movably sleeved on the rotating shaft to make the pedal conduct the coordinative rotary movement changes during the pedaling process of the operator's feet. In addition to allowing the operator to drive the body building exerciser or bicycle into motion, the above-said pedals have no other actions, therefore, the pedal structure provided by the present invention is a novel massage functional pedal structure to enhance the usage functions of the pedal structure.

SUMMARY OF THE INVENTION

Based upon an analysis of the devices of the conventional pedal structure and the mechanism of its movements, when the rotational shaft rotates one revolution along with the crank arm, the rotational shaft itself also rotates one revolution. This invention utilizes the principle of the rotational shaft's rotational action as the prime driving source.

The present invention provides a massage functional pedal structure which can be mounted on a body building exerciser or bicycle. Its feature is that the pedal itself is thicker than a conventional pedal and has an internally hollow design. In addition to the rotational shaft, another three crank shafts also are mounted in the pedal with one end of the rotation shaft and the three crank shafts engaged by gears, respectively, to make all the three crank shafts rotate when the rotating shaft is rotated. Also, a link is pivotally connected at one end to a plurality of offset portions on each of the said three crank shafts, respectively, and the other end of the said link is pivotally connected to an elongated cylinder. When the three crank shafts are driven, their links also drive each elongated cylinder into up-and-down displacement actions on an upper end face of the pedal body so as to produce the massage effects on the user's soles.

DETAILED DESCRIPTION OF THE PREFERRED EMBODIMENT

Figure 1:
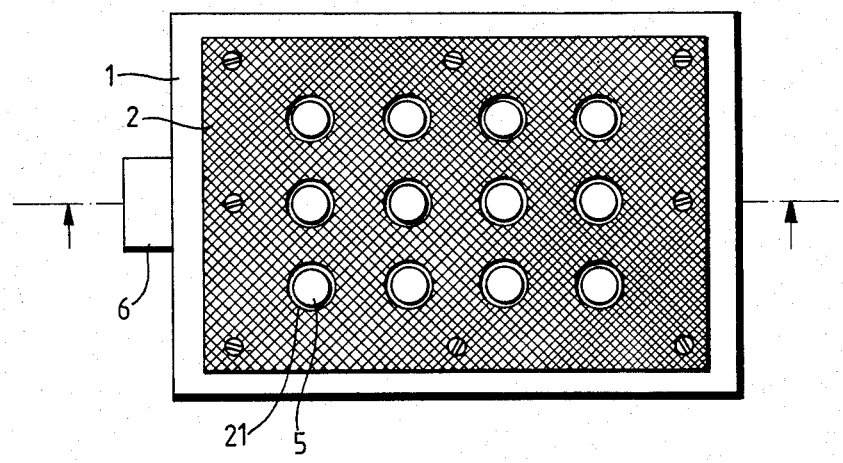
FIG. 1 is a top view according to the present invention.
Figure 2:
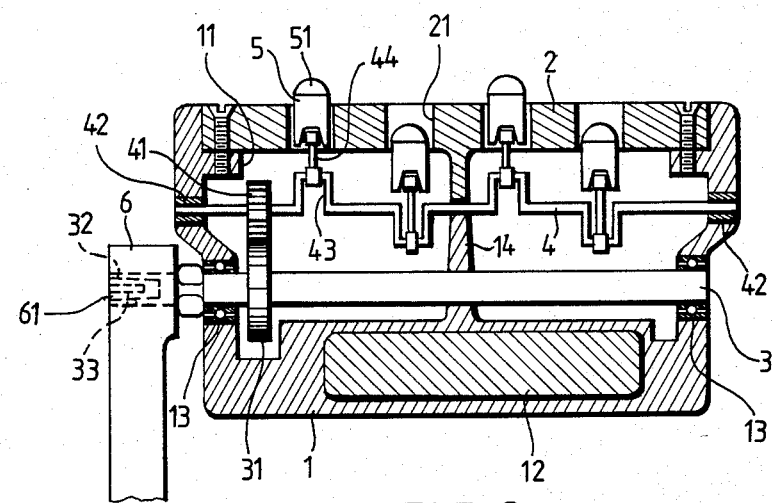
FIG. 2 is a cross section along the line A—A in FIG. 1.
Figure 3:
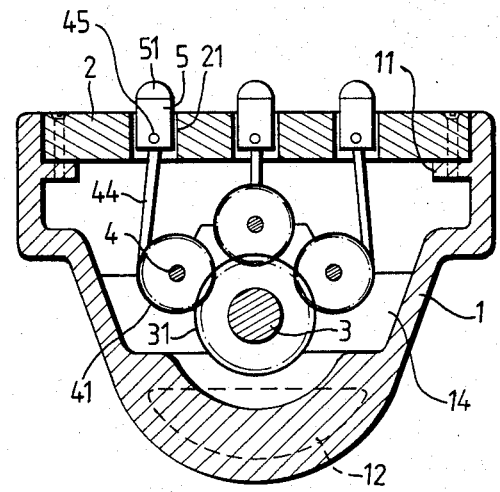
FIG. 3 is a side cross section according to the present invention.

Shown in FIGS. 1-3, the pedal body (1) according to the present invention is in a rectangular shape with its thickness larger than that of the conventional pedals, its bottom side being slightly recessed and in an arcuate shape. The inner part of the pedal body (1) is hollow and open at its upper side and an inwardly protruding flange (11) is provided to support a face board (2). A rotating shaft (3) passes through the pedal body (1) at center of the side of (1) and also slightly toward the lower side of (1), and roller bearings (13) are placed on each side of the pedal body so that the pedal has a smooth rotary function. Also, in the hollow inner part of the pedal body (1), three crank shafts (4) are provided, each of which has a pinion (41) fixedly attached to one end thereof. A large gear (31) which is fixedly provided on one side of the rotating shaft (3), from FIG. 3, is engaged with the said three crank shafts (4), which are respectively distributed above and on the two sides of the shaft (3). The three pinions (41) are smaller than the large gear (31) on the one end of the rotating shaft (3), so the ratio between the numbers of their teeth is 2:1 or 3:1, i.e. whenever the large gear (31) is rotated one revolution, each pinion (41) rotates 2 or 3 revolutions. A bushing (42) is provided respectively on each end of the pedal body (1) for each of the three crank shafts (4) to make the rotations of the crank shafts (4) very smooth. In addition, various crank shafts (4) have several cam means or offset portions (43), each adjoining two offset portions (43) being 180° apart. Each offset portion (43) is rotatably joined to one end of a link (44) and the other end of the link (44) is rotatably joined to an elongated cylinder (5) by a pivot pin.

As shown in FIG. 2, one end of the rotating shaft (3) extends a proper length out of the pedal body (1) and is fixedly joined to a crank arm (6). To improve the joint's force-bearing capability, a tapered screw hole (32) and a radial cutout slot (33) are provided in the center of the end face of the said extension. The rotating shaft (3) is joined to the crank arm (6) with a tapered screw (61) which is screwed into the tapered screw hole (32) in the end part of the said rotating shaft (3). Since the said end has a radial cutout slot (33), the extension of shaft (3) is expanded against the crank arm (6) to make both of them have very good joining functions, which, in turn, makes the rotating shaft (3) have a better force-bearing capability to avoid any slip-off from the crank arm (6) in the assembled state.

Figure 4:
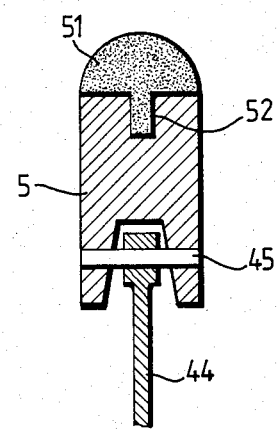
FIG. 4 is a cross section of the elongated cylinder structure of the elongated cylinder according to the present invention.

The above-said face board (2) is fixedly joined to the pedal body (1) by proper means such as with screws and/or adhesives. Three rows of through-holes (21) are provided in the face board (2), the number of the through-holes (21) in each of the said rows being equal to the number of offset portions (43) of the three crank shafts (4) and having positions which correspond to the locations of the offset portions (43). The diameter of each through-hole is slightly larger than that of the elongated cylinder (5) so that the cylinder (5) moves up-and-down in the through-hole (21). Also, the surface of the said face board has embossed patterns to avoid having the user's feet slipping off therefrom during his peddling actions. When the plurality of elongated cylinders (5) are at their uppermost positions during their up-and-down movements, they protrude about 15 mm above and out of the face board (2). The structure of the said elongated cylinder (5), as shown in FIG. 4, is provided at its top with a semi-circular head (51), the head (51) being made of a flexible material with a proper hardness, such as rubber or plastic, while the bottom end face of the head (51) is provided with an extension (52) for joining the head (51) to the elongated cylinder (5).

The pedal body (1) according to the present invention is formed from steel or plastic through a molding or casting process. A metal weight (12) is provided at the bottom of the pedal body (1) to orient the pedal body (1) such that the face board (2) is maintained in an upward-facing position. Besides, in the hollow center of the pedal body, a support plate (14) is provided to support the lower surfaces of the three crank shafts (3), thereby increasing the stability of the crank shafts (3) and also avoiding deformation to the crank shafts (3) under the applied forces.

Now, the principle of the actions and the functions of the present invention are described as follows:

As mentioned above, the present invention uses the principle that when the crank arm (6) rotates one revolution, it simultaneously drives the rotating shaft (3) one revolution. The pedal bodies (1) are installed on the respective crank arms (6) on both sides of a bicycle or treadmill and when rotated by the operator's feet the rotating shaft (3) also rotates accordingly and makes the large gear (31) provided on its one end rotate therewith. The rotation of the large gear (31) drives all three of the pinions (41) engaged with the large gear (31) into motion. Since the gear ratio between the large gear and the pinions is 2:1 or 3:1, the pinions (41), which are fixedly joined to the crank shafts (4), cause the crank shafts (4) to effect a faster rotation. The offset portions (43) of the crank shafts (4), which are connected by links to the elongated cylinders (5), cause changes of the high and low positions of the elongated cylinders (5) and the elongated cylinder (5) is subjected to the linking movements along with the position changes of the link (44), thereby conducting the up-and-down movements in the through-hole (21) in the face board (2). The elongated cylinders repeatedly impact the operator's soles, and if the operator's pedalling actions become faster, the up-and-down displacements of the elongated cylinders (5) are relatively increased, so the impacts thus applied on a user's soles are relatively close and frequent, thereby achieving the same effects as that of finger massages to promote blood circulation in the feet.

Since the action of the present invention is to provide a massage function to the user's soles, during the user's operation the user should operate the pedals with his bare feet so that the expected effects will be produced. Further, as the head (51) of the said elongated cylinder (5) is made of a flexible material which has a semi-circular shape, there will not be any sensation of sharp pricking pains on the user's soles, thereby making the operator simultaneously benefit from the massage effects, while performing the physical exercises with a new sense of enjoyment.

Figure 6:
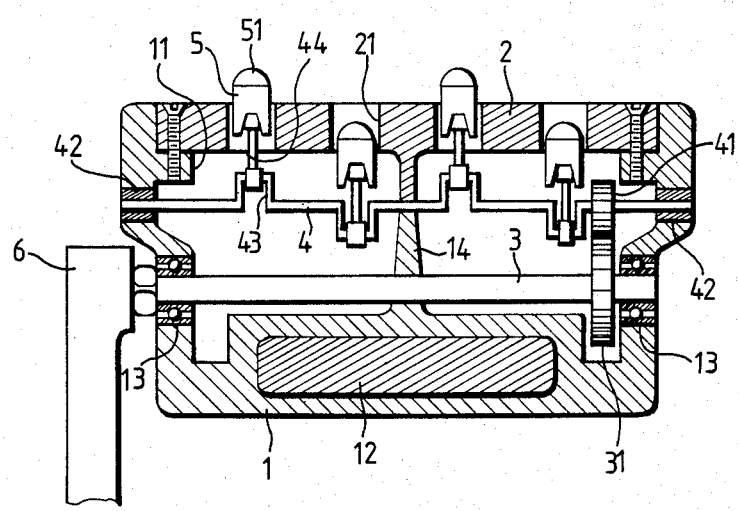
FIG. 6 is a cross section of another example of the structure shown in FIG. 2.

Shown in FIG. 6 is another example of the pedal structure according to the present invention, wherein the large gear (31) on the rotating shaft (3) is installed on the other end of the rotating shaft (3), the pinions (41) on the said three crank shafts (4) are also moved to the same side and thus engage the large gear (31). This structural example produces the identical effects as the structure shown in FIG. 2.

Figure 5:
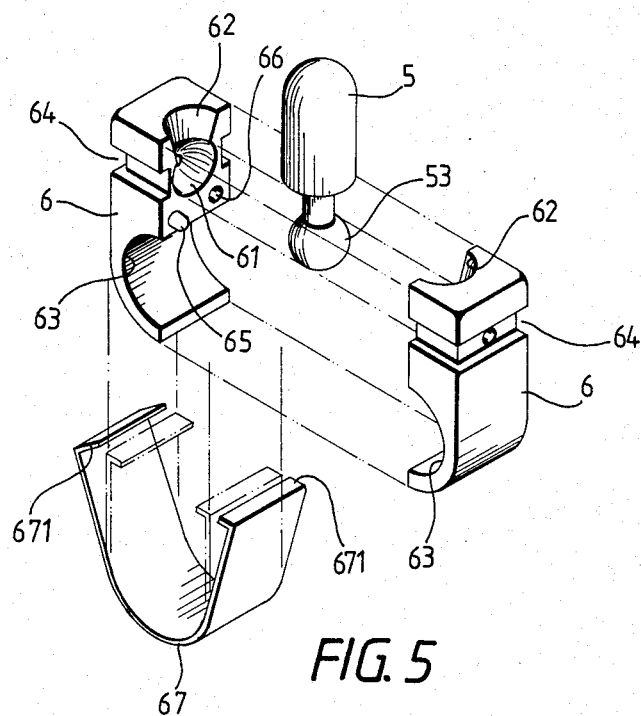
FIG. 5 is a tridimensional exploded view of another structure of the elongated cylinder according to the present invention.

Shown in FIG. 5 is another structural example of the said elongated cylinder (5), the feature of which is that the bottom of the elongated cylinder (5) is integrally formed to have a sphere (53). Two identical clamping seats (6) are joined together at corresponding faces for clamping and positioning the sphere (53) of the elongated cylinder (5); a semi-spherical concave seat (61) is provided on each of the corresponding faces of the said two clamping seats (6) respectively, and a semi-circular conical hole (62) extends from the top face to the semi-spherical concave seat (61); the lower side of the clamping seats (6) has a semi-circular through-hole (63) respectively, and its outer circumferential surface part has an annular concave slot (64), and a group of corresponding convex posts (65) and concave holes (66) are provided respectively on the said corresponding faces. The two clamping seats (6) are combined together, thereby forming a spherical hole, a conical hole and a through-shaft hole for pivotally holding the sphere (53) at the lower side of the said elongated cylinder (5) in the spherical hole. The upper end of the elongated cylinder (5) extends out of the top face of the combined clamping seats (6) through the said conical hole. The through-shaft hole formed in the lower side of the combined clamping seats (6) receives a corresponding offset portion of a crank shaft (4). When the said two clamping seats (6) are combined together, the protruding posts (65) and the concave holes (66) on its corresponding faces also correspondingly match together and a suitable elastic spring clamp plate (67) then encloses the combined clamping seats from their lower side to their upper side, the folded edges (671) on the two ends of the spring clamp plate (67) being clamped in the concave slots (64) in the two clamping seats (6), thereby firmly joining the two clamping seats (6) in position.

As described above, the sphere (53) extending below the said elongated cylinder (5) is contained and enclosed in the spherical hole formed in the two clamping seats (6) and the conical hole allows the combined clamping seats (6) to make a suspended swinging motion within an angle corresponding to positions of the offset portions (43) whereby the elongated cylinder (5) has an up-and-down displacement action in the through-hole (21) of the face board, when it is driven by the crank shaft (4).

Figure 7:
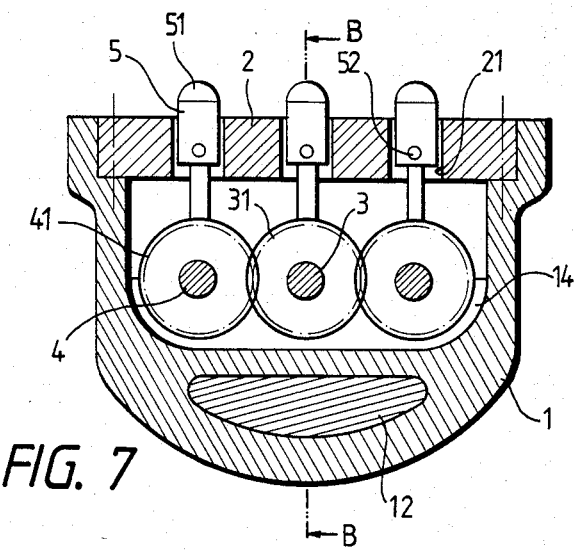
FIG. 7 is a side cross section of the second example of the pedal structure according to the present invention.
Figure 8:
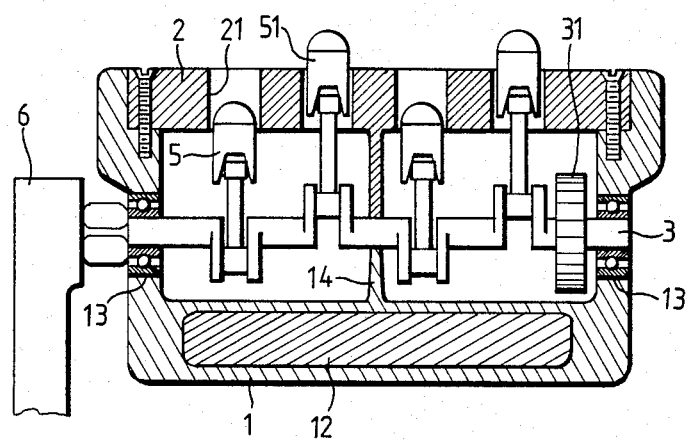
FIG. 8 is a cross section along the line B—B in FIG. 7.
Figure 9:
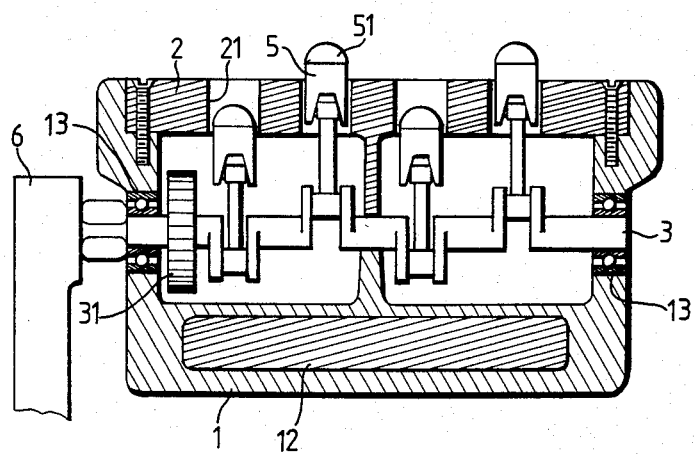
FIG. 9 is a cross section of another example of the structure shown in FIG. 8.

A second embodiment of the invention is shown in FIGS. 7 and 8, which show end and side views, respectively of the pedal body (1) with the rotating shaft (3) forming a crank shaft, and the said elongated cylinders (5) are installed on the offset portions of the rotating shaft (3) to achieve the same driving functions. As shown in FIGS. 8 and 9, the position of the gear 31 may be at either end of the pedal body (1) but the driving functions of the gear at either position are identical.

I claim:

1. A pedal for a rotary crank exercise apparatus which has a massaging effect on a user's foot comprising:
   a pedal body having an opening on one end thereof, said opening extending inwardly of said pedal body to define a hollow interior;
   a rotating shaft rotatably mounted in said interior of said pedal body, said shaft having a gear connected thereto in said interior of said pedal body and means on an end of said rotating shaft for attachment to a crank arm of an exercising apparatus;
   at least one crank shaft rotatably mounted in said pedal body, each said crank shaft having a pinion engaging said gear of said rotating shaft for imparting rotation to each said crank shaft when said rotating shaft is rotated, each said crank shaft having a plurality of offset portions within said interior of said pedal body;
   a face board having a plurality of through-holes each of which corresponds to one of said offset portions, said face board mounted in said opening of said pedal body;
   a plurality of elongated cylinders each of which is slidably disposed in a respective through-hole of said face board; and
   a plurality of links each of which is pivotally connected at one end thereof to a respective elongated cylinder and at the other end thereof to a corresponding one of said offset portions, each of said links having a length which causes a corresponding elongated cylinder to reciprocate from positions above and below an outer surface of said face board when said rotating shaft is rotated to thereby produce a massaging effect on the sole of a user's foot.

2. The pedal of claim 1, wherein said at least one crank shaft comprises two or more crank shafts.

3. The pedal of claim 1, wherein each of said elongated cylinders includes an arcuate head portion for contacting the sole of a user's foot, said head portion being formed of a flexible material which comprises rubber or plastic.

4. The pedal of claim 1, wherein said gear on said rotating shaft has at least twice as many gear teeth as said pinion on said at least one crank shaft whereby said at least one crank shaft rotates at least twice as fast as said rotating shaft.

5. The pedal of claim 1, further comprising a support plate disposed in a central portion of said interior of said pedal body, said support plate rotatably supporting said rotating shaft and said at least one crank shaft.

6. The pedal of claim 1, further comprising a plurality of offset portions on said rotating shaft, said face board having through-holes corresponding to said offset portions of said rotating shaft, elongated cylinders slidably disposed in said through-holes corresponding to said offset portions of said rotating shaft and links each of which is pivotally connected between a respective offset portion of said rotating shaft and a corresponding elongated cylinder.

7. The pedal of claim 1, further comprising a weight mounted in said pedal body between said rotating shaft and a side of said pedal body which is opposite to said opening whereby said pedal body is maintained with said opening facing upwardly when said pedal body is mounted for rotation about said rotating shaft.

8. The pedal of claim 1, wherein said means for attaching said rotating shaft to a crank arm of an exercising apparatus comprises a conical screw hole in an axial end surface of said rotating shaft, a radial slot extending from opposite sides of said conical screw hole, said rotating shaft being joined to a crank arm by means of a conical screw which effects expansion of said conical screw hole due to said radial slot whereby a stable joint can be formed between said rotating shaft and the crank arm.

9. The pedal of claim 1, wherein each of said elongated cylinders has an arcuate head portion at one end thereof and a sphere formed at the other end thereof, the pedal further comprising a pair of clamping seats for each cylinder, said sphere being pivotally held by said pair of identically shaped clamping seats fitted around said sphere, each said clamping seat having a semi-spherical concave seat connected to a semi-circular concial hole extending through one end of said clamping seat, said clamping seat having a semi-circular through-hole disposed between said semi-spherical concave seat and the other end of said clamping seat, said clamping seat having convex posts and concave holes on a face thereof which is fitted to a corresponding face of an identical clamping seat, a pair of clamping members being joined by said convex posts of one clamping member being received in said concave holes of a second clamping member to thereby pivotally hold said sphere of a respective elongated cylinder in a spherical seat formed by a pair of said semi-spherical concave seats with said elongated cylinder extending from a conical hole formed by a pair of said semi-circular conical holes, one of said offset portions being received in an opening formed by a pair of said semi-circular through-holes, said clamping member having an arcuate concave slot on an exterior surface thereof and a spring clamping plate engaged with said arcuated concave slot on each of said pair of clamping members for holding said clamping members together.

10. The pedal of claim 1, wherein said gear and said pinion of each said crank shaft are disposed inwardly of an end wall of said pedal body which is adjacent said means on said rotating shaft for attachment to a crank arm.

11. The pedal of claim 1, wherein said gear and said pinion of each said crank shaft are disposed inwardly of an end wall of said pedal body which is opposite to an end wall of said pedal body which is adjacent to said means on said rotating shaft for attachment to a crank arm.

12. The pedal of claim 1, wherein three crank shafts are mounted in said pedal body, a first one of said crank shafts being disposed between said rotating shaft and said face board and the other two crank shafts being mounted on either side of said first crank shaft.

* * * * *